United States Patent
Gammon

(10) Patent No.: US 9,057,654 B2
(45) Date of Patent: Jun. 16, 2015

(54) DIFFERENTIAL PRESSURE GAUGE

(71) Applicant: James H. Gammon, Manasquan, NJ (US)

(72) Inventor: James H. Gammon, Manasquan, NJ (US)

(*) Notice: Subject to any disclaimer, the term of this patent is extended or adjusted under 35 U.S.C. 154(b) by 267 days.

(21) Appl. No.: 13/800,425

(22) Filed: Mar. 13, 2013

(65) Prior Publication Data

US 2013/0291645 A1    Nov. 7, 2013

Related U.S. Application Data

(60) Provisional application No. 61/640,832, filed on May 1, 2012.

(51) Int. Cl.
| | |
|---|---|
| *G01L 13/02* | (2006.01) |
| *G01L 7/16* | (2006.01) |
| *G01L 19/10* | (2006.01) |
| *G01L 19/14* | (2006.01) |

(52) U.S. Cl.
CPC . *G01L 7/16* (2013.01); *G01L 13/02* (2013.01); *G01L 19/10* (2013.01); *G01L 19/143* (2013.01)

(58) Field of Classification Search
None
See application file for complete search history.

(56) References Cited

U.S. PATENT DOCUMENTS

| 1,220,488 | A | | 3/1917 | Bailey | |
|---|---|---|---|---|---|
| 3,182,630 | A | | 5/1965 | Claeys | |
| 3,610,046 | A | | 10/1971 | Lissau | |
| 3,630,071 | A | * | 12/1971 | Newhall | 73/1.65 |
| 4,030,368 | A | * | 6/1977 | Runge | 73/744 |
| 4,143,545 | A | * | 3/1979 | Sitabkhan | 73/146.8 |
| 4,366,717 | A | | 1/1983 | Foord et al. | |
| 4,717,873 | A | | 1/1988 | Carr, Jr. et al. | |
| 2005/0150304 | A1 | * | 7/2005 | Gustafson et al. | 73/754 |
| 2012/0036937 | A1 | * | 2/2012 | Sprenger et al. | 73/744 |

* cited by examiner

*Primary Examiner* — Andre Allen
(74) *Attorney, Agent, or Firm* — Fraser Clemens Martin & Miller LLC; James D. Miller

(57) ABSTRACT

A pressure gauge including a hollow cylinder, a first housing member having a first pressure inlet disposed at a first end of the cylinder, and a second housing member having a second pressure inlet disposed at a second end of the cylinder. The pressure gauge also includes a piston slidably disposed in the first housing member. The piston includes a remote indicator coupled to an end of the piston. At least a portion of the remote indicator extends into the hollow cylinder. A spring is disposed in the cylinder abutting the remote indicator and urges the remote indicator toward the second housing member. An increased pressure difference between the first pressure inlet and the second pressure inlet causes the remote indicator to move away from the second housing member and toward the first housing member, and the remote indicator provides a measure of the pressure difference relative to indicia included on the pressure gauge.

20 Claims, 1 Drawing Sheet

DIFFERENTIAL PRESSURE GAUGE

CROSS-REFERENCE TO RELATED APPLICATION

This application claims priority to U.S. Provisional Application Ser. No. 61/640,832, filed May 1, 2012, the entire disclosure of which is hereby incorporated herein by reference.

FIELD OF THE INVENTION

The present disclosure relates to a differential pressure gauge and more particularly to a gauge for measuring and displaying differential pressure using a remote indicator.

BACKGROUND OF THE INVENTION

It is often beneficial to monitor the condition of filter elements. One of the most common ways to monitor the condition of filter elements is to measure a pressure drop across a filter vessel using a differential pressure gauge. A measurable difference in pressure occurs over time because, in a clean filter, a fluid being filtered flows freely without restriction, and in a filter filled with dirt and debris, the fluid flow is restricted. Accordingly, a fluid flowing through a clogged filter will have a higher pressure before entering the filter and a lower pressure after exiting the filter.

Many types of differential pressure gauges are available. For example, a piston-type gauge can be used to measure pressure drop. A piston-type gauge typically includes a piston that is tightly fit into a cylinder, with a spring attached to one end of the piston. A fluid having a higher pressure is directed by tubing to one end of the piston while a fluid having a lower pressure is directed by tubing to an opposite end of the piston. The spring is configured to oppose motion of the piston in a direction from the higher pressure source to the lower pressure source. The pressure from each respective fluid source exerts a force on each respective end of the piston. When the difference in pressure between the two ends of the pistons is zero, the spring does not compress or extend and the piston is at rest. However, as the difference in pressure becomes greater, the piston is displaced, compressing or extending the spring until the forces on each side of the piston are equal. The position of the piston indicates the difference in pressure between the two ends of the piston.

The position of the piston may be determined in various ways. For example, the cylinder may be clear, allowing a user to actually see the altered position of the piston. Often this clear cylinder is in the form of a glass tube. There are, however, many disadvantages to housing the piston in a glass tube. One common problem is that the glass tube and the piston must each be formed from materials having a similar coefficient of thermal expansion for the piston to retain its close fitting relationship within the glass tube, especially when the piston-type gauge experiences a wide range of temperatures during use. Unfortunately, those materials available for forming the piston to have a coefficient of thermal expansion similar to that of glass are typically expensive metallic alloys, such as Invar 36, that greatly increases the cost of the piston-type gauge. These high cost metallic alloys are also problematic as they often are difficult to machine without causing serious burring in the metallic alloy, which in turn affects the quality of the seal between the piston and the glass tube.

Another problem associated with the use of a glass tube as a housing for the piston is that the strength of a glass tube decreases as a selected diameter of the glass tube is increased, prohibiting the piston-type gauge from utilizing a larger diameter glass tube if high internal pressures act on the glass tube. This occurs because the wall tension found in a cylindrical chamber is directly proportional to both the diameter of the cylindrical chamber and the internal fluid pressure within the cylindrical chamber, meaning that larger diameter glass tubes experience greater wall tensions than smaller diameter glass tubes exposed to the same internal pressure. Accordingly, larger diameter glass tubes fail due to wall tension at lower internal pressures than do smaller diameter glass tubes.

When the glass tube is used to house the piston, the diameter of the glass tube also limits the maximum diameter of the piston to be no greater than the inner diameter of the glass tube. This in turn limits the accuracy of the differential pressure reading. This occurs because the piston is manufactured to have certain tolerances in regards to the manufactured dimensions of the piston. Smaller dimensioned parts introduce a greater percentage of error than do larger dimensioned parts. Because the accuracy of a piston-type gauge is largely determined by an accurate measurement of the surface area of the piston end contacting the pressurized fluid, use of larger diameter pistons with less associated error is preferable.

Alternatively, other piston-type gauges utilize a magnetic sensor to show the position of the piston. However, disadvantages of using a piston displayed through a magnetic sensor include expensive materials and manufacturing processes, increased errors due to damage or interference from the presence of contaminants of a magnetic nature between the piston and the cylinder, and a general decrease in the accuracy of the pressure difference readings due to unnecessary components.

It would be desirable to produce a differential pressure gauge including a remote indicator located remotely from a sensing area of the piston that minimizes errors, maximizes reliability, does not attract contaminants of a magnetic nature, and is inexpensive to make.

SUMMARY OF THE INVENTION

Consonant with the present invention, a differential pressure gauge including a remote indicator located remotely from a sensing area of the piston that minimizes errors, maximizes reliability, does not attract contaminants of a magnetic nature, and is inexpensive to make, has surprisingly been discovered.

In one embodiment of the invention, a differential pressure gauge includes a hollow cylinder, a first housing member disposed at a first end of the hollow cylinder, and a second housing member disposed at a second end of the hollow cylinder. The differential pressure gauge further includes a piston having a first end and a second end, wherein the piston is slidably disposed in the first housing member, and a remote indicator coupled to the second end of the piston, wherein at least a portion of the remote indicator extends into the hollow cylinder and provides a visual indication of a pressure difference between the first end and the second end of the piston.

In another embodiment of the invention, a differential pressure gauge includes a hollow cylinder including at least a portion of which is one of transparent and translucent, a first housing member disposed at a first end of the hollow cylinder, and a second housing member disposed at a second end of the hollow cylinder. The differential pressure gauge further includes a piston having a first end and a second end, wherein the piston is slidably disposed in the first housing member, and a remote indicator coupled to the second end of the piston, wherein at least a portion of the remote indicator extends into the hollow cylinder adjacent the portion of the cylinder that is one of transparent and translucent and provides a visual indication of a pressure difference between the first end and the second end of the piston by comparing a position of the remote indicator relative to indicia located at least one of overlapping and adjacent the portion of the cylinder that is one of transparent and translucent.

In yet another embodiment of the invention, a differential pressure gauge includes a hollow cylinder, a first housing member disposed at a first end of the cylinder, the first housing member having a first pressure inlet in fluid communication with a first source of a pressurized fluid, and a second housing member disposed at a second end of the cylinder, the second housing member having a second pressure inlet in fluid communication with a second source of a pressurized fluid having a higher pressure than the first source of a pressurized fluid. The differential pressure gauge further includes a piston having a first end in fluid communication with the first pressure inlet and a second end in fluid communication with the second pressure inlet, wherein the piston is slidably disposed in the first housing member, a remote indicator coupled to the second end of the piston, at least a portion of the remote indicator having a visual indicator extending into the hollow cylinder, and a spring configured to urge the remote indicator in a direction toward the second housing member and away from the first housing member. An increased pressure difference between the first pressure inlet and the second pressure inlet causes the remote indicator to move in a direction away from the second housing member and toward the first housing member, and the visual indicator provides a measure of the pressure difference between the first end and the second end of the piston.

BRIEF DESCRIPTION OF THE DRAWINGS

The above, as well as other advantages of the present invention, will become readily apparent to those skilled in the art from the following detailed description when considered in the light of the accompanying drawing, in which.

DETAILED DESCRIPTION OF AN EMBODIMENT OF THE INVENTION

The following detailed description and appended drawing describe and illustrate an exemplary embodiment of the invention. The description and drawing serve to enable one skilled in the art to make and use the invention, and are not intended to limit the scope of the invention in any manner.

Figure 1:
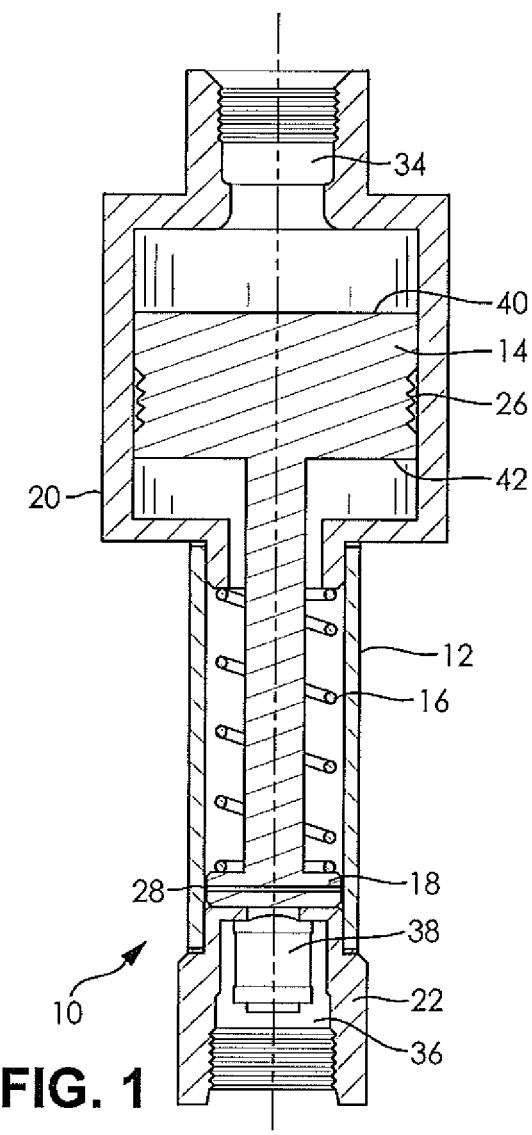
FIG. 1 is a cross-sectional side elevational view showing a differential pressure gauge including a remote indicator taken through line 1-1 in FIG. 2.

Referring to FIG. 1, there is illustrated a differential pressure gauge incorporating the features of the disclosure, generally indicated by reference numeral 10. The differential pressure gauge 10 includes a cylinder 12, a piston 14, a spring 16, and a remote indicator 18. The differential pressure gauge 10 also includes a first housing member 20 and a second housing member 22.

The cylinder 12 is hollow and open at each of two spaced apart ends. The cylinder 12 may be any size and shape appropriate for housing the spring 16 and the remote indicator 18. However, it may be preferable for an outer diameter of the cylinder 12 to be minimized because hollow cylindrical vessels withstand greater internal pressures when the outer diameter of the cylindrical vessel is minimized. This effect is explained by LaPlace's law, which teaches that a wall tension formed in a cylindrical vessel is directly proportional to the diameter of the vessel, meaning that a larger diameter vessel will undergo greater wall tension at the same internal pressure than a smaller diameter vessel. If the cylinder 12 endures a great enough wall tension, the cylinder 12 will fail due to the wall tension. Accordingly, a smaller diameter cylinder 12 will withstand greater internal pressures before failing due to wall tension than a larger diameter cylinder 12.

Typically, the cylinder 12 is made from glass, plastic, metal, or any other appropriate material capable of withstanding a predetermined pressure throughout the cylinder 12. The cylinder 12 may be transparent or translucent, or may include a portion that is transparent or translucent. The cylinder is transparent or translucent in order for a user to visually identify the amount of displacement of the piston 14 and the remote indicator 18 during operation of the differential pressure gauge 10.

The first housing member 20 abuts a first end 30 of the cylinder 12. The cylinder 12 and the first housing member 20 form a seal using o-rings or other sealing means. The first housing member 20 includes a first pressure inlet 34 configured for communication with a first source of pressurized fluid (not shown). The first pressure inlet 34 is typically in communication with a low pressure source of fluid. Any conventional non-corrosive material capable of withstanding a predetermined pressure throughout the first housing member 20 may be used to form the first housing member 20, including, for example, plastic, anodized aluminum, and stainless steel. The first housing member 20 includes an open cylindrical chamber therein that houses the piston 14. The first housing member 20 is dimensioned to have a minimal clearance between the housing member 20 and an outer wall of the piston 14 such that the piston may slide within the first housing member 20 while preventing the pressurized fluid from easily passing between the first housing member 20 and the piston 14.

The second housing member 22 abuts a second end 32 of the cylinder 12. The cylinder 12 and the second housing member 22 form a seal using o-rings or other sealing means. The second housing member 22 includes a second pressure inlet 36 configured for communication with a second source of pressurized fluid (not shown). The second pressure inlet 36 is typically in communication with a high pressure source of fluid. Any conventional non-corrosive material capable of withstanding a predetermined pressure within the second housing member 22 may be used to form the second housing member 22, including, for example, plastic, anodized aluminum, and stainless steel. The second housing member 22 may house a filter 38. The filter 38 militates against harmful contaminants entering the cylinder 12 and disrupting the operation of the piston 14.

It should be understood that the terms "low pressure" and "high pressure" refer to a pressure being measured relative to another pressure, and do not refer to absolute pressure values. In other words, reference to a "low pressure" refers to a pressure value that is less than a pressure value referenced as a "high pressure," and vice versa.

The piston 14 is slidably disposed in the first housing member 20. The piston 14 may be produced from any non-corrosive material capable of withstanding a predetermined pressure throughout the differential pressure gauge 10. The material forming the piston 14 should also be capable of sliding through the first housing member 20 while minimizing friction.

There are certain advantages to forming the piston 14 and at least the first housing member 20 from the same material. The piston 14 is dimensioned to slidably fit in the first housing member 20 with a clearance of about 0.0003 inches to maintain a fluid tight seal between the piston 14 and the first housing member 20. If the piston 14 and the first housing member 20 are formed from two different materials having different coefficients of thermal expansion, the components may expand or contract relative to each other an undesirable amount when facing variable system temperatures, causing the clearance to become too small or too large while limiting the effectiveness of the differential pressure gauge 10. If the piston 14 and the first housing member 20 are formed from different materials, it may be necessary for one of the components to be coated with another material having a coefficient of thermal expansion similar to that of the other component. Often, this coating is an expensive and difficult to machine metallic alloy. It is therefore beneficial to form the piston 14 and the first housing member 20 from the same non-corrosive material, for example, plastic, anodized aluminum, or stainless steel.

The piston 14 includes a first end 40 and a second end 42. The first end 40 is in fluid communication with the low pressure source of fluid via the first pressure inlet 34 while the second end 42 is in fluid communication with the high pressure source of fluid via the second pressure inlet 36. It may be desirable to maximize a selected outer diameter of the piston 14 because a larger diameter piston 14 will yield more accurate differential pressure readings than a smaller diameter piston 14. This occurs because a larger dimensioned piston 14 introduces a smaller percentage of error than a smaller dimensioned piston 14 if the manufacturing tolerances remain essentially the same. A more accurate measurement of the surface area of the ends 40, 42 of the piston 14 as manufactured will accordingly provide a more accurate differential pressure reading.

As described hereinabove, it is beneficial to minimize an inner diameter of the cylinder 12 while maximizing an outer diameter of the piston 14. For this reason, it may be beneficial for the differential pressure gauge 10 to have a piston 14 having a larger outer diameter than an inner diameter of the cylinder 12, as shown in FIG. 1. It should be understood, however, that the differential pressure gauge 10 may be altered to include a piston 14 having an outer diameter equal to or smaller than an inner diameter of the cylinder 12, as desired. This alternate dimensioning of the cylinder 12 and the piston 14 may be desirable in applications where the differential pressure gauge 10 is expected to encounter relatively low system pressures that would not cause failure of the cylinder 12.

The piston 14 may include a series of grooves 26 on an outer surface of the piston that form a seal with an inner surface of the first housing member 20. The grooves 26 may be formed such that they form a labyrinth seal. The labyrinth seal is advantageous as it forms a substantially fluid tight seal between separate components even when the components move relative to one another. The labyrinth seal accomplishes this by reducing the energy of the fluid flowing between the two components being sealed as the fluid passes between the two components. The grooves 26 formed in the piston 14 create an alternating series of narrow passages and widening chambers, the narrow passages being areas along the piston 14 where no groove 26 has been formed and the widening chambers being formed by the grooves 26 themselves. The alternating narrow passages and widening chambers of the labyrinth seal provides a tortuous path between the two components being sealed such that any fluid that enters the labyrinth seal will lose significant energy as the fluid encounters each successive groove 26. Accordingly, the grooves 26 militate against the fluid passing from one end of the piston 14 to an opposing end thereof.

Yet another advantage to having the first housing 20 and the piston 14 formed from the same material is that the seal formed by the grooves 26 is much easier to manufacture than a seal between a piston having a metallic alloy coating and a cylinder formed as a glass tube. Pistons that are plated with a metallic alloy having a substantially similar coefficient of thermal expansion as glass are often difficult to machine as burring is more prevalent in such metallic alloys than in more traditional piston materials, such as aluminum and stainless steel. Debuning such edges is both time consuming and expensive. Accordingly, it may be beneficial to avoid selection of materials that cause significant burring when machined.

The remote indicator 18 may be integrally formed at a second end 42 of the piston 14, or may be a separate component rigidly connected to the second end 42 of the piston 14, as shown. The remote indicator 18 may be attached to the piston 14 in any conventional manner. A wire, cable, rod, or other conventional means may be used. The remote indicator 18 extends from the second end 42 of the piston 14 and at least a portion of the remote indicator 18 extends into the cylinder 12 during a full range of possible positions of the piston 14 and the remote indicator 18. Because the piston 14 and the remote indicator 18 are integrally formed or rigidly attached, it should be understood that both the piston 14 and the remote indicator 18 will undergo the same degree of displacement as the piston 14 slides in the first housing member 20. The remote indicator 18 is dimensioned to provide a clearance between the cylinder 12 and the remote indicator 18 so the pressurized fluid entering from the second pressure inlet 36 may be in fluid communication with the second end 42 of the piston 14. The remote indicator 18 may be made from any suitable non-corrosive material capable of withstanding the predetermined system pressures of the differential pressure gauge 10, such as plastic, anodized aluminum, and stainless steel.

The remote indicator may include a visual indicator 28 such as a brightly colored bead or line at an end of the remote indicator 18 not attached to, or integrally formed with, the second end 42 of the piston 14. The visual indicator 28 is aligned relative to the cylinder 12 such that any transparent or translucent portion of the cylinder 12 allows for visual inspection of the visual indicator 28.

The spring 16 is typically a helical compression spring but may be any spring capable of exerting pressure on the remote indicator 18 and withstanding a predetermined pressure in the differential pressure gauge 10. The spring 16 may be any size and shape capable of being housed in the cylinder 12. As shown, a first end of the spring 16 abuts the remote indicator 18 and a second end of the spring 16 abuts the first housing member 20. The spring 16 urges the remote indicator 18 and the rigidly connected piston 14 in a direction toward the second housing member 22 and away from the first housing member 20. The spring 16 is configured to have a substantially linear relationship between the degree of compression of the spring 16 and the resultant force the spring 16 applies to the piston 14. It should be understood that the spring 16 may be arranged in various orientations so long as it urges the piston 14 and the remote indicator 18 in a direction toward the second housing member 22 and away from the first housing member 20 during operation of the differential pressure gauge 10. For instance, the spring 16 may be arranged as an extension spring attached to the second housing member 22 and the remote indicator 18, or alternatively, as a compression spring attached to the first end 40 of the piston 14 and the first housing member 20 adjacent the first pressure inlet 34, as desired.

Figure 2:
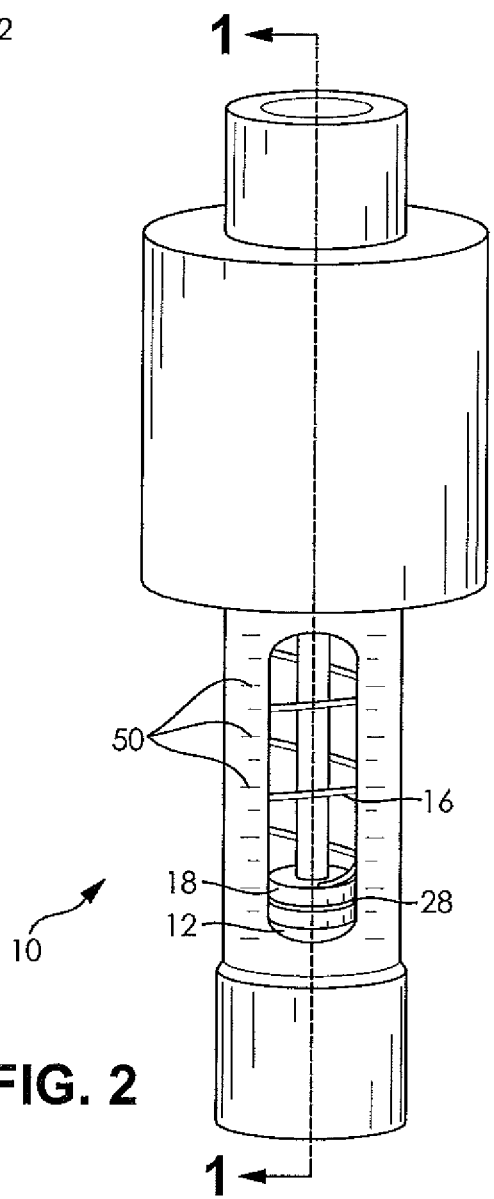
FIG. 2 is a front elevational view of the differential pressure gauge of FIG. 1.

In use, the source of high pressure fluid is in fluid communication with the differential pressure gauge 10 through the second pressure inlet 36 and the source of low pressure fluid is in fluid communication with the differential pressure gauge 10 through the first pressure inlet 34. An increase in pressure difference between the first pressure inlet 34 and the second pressure inlet 36 causes the piston 14 to slide hi a direction away from the second pressure inlet 36 and toward the first pressure inlet 34. Simultaneously, the remote indicator 18 moves away from the second housing member 22 and toward the first housing member 20, thereby compressing the spring 16. The remote indicator 18 includes the visual indicator 28 which a user may use to determine a measurement of the pressure difference in the differential pressure gauge 10. Such measurement can be made using indicia 50 formed on or adjacent the cylinder 12, as shown in FIG. 2. Any portion of the cylinder 12 that is formed to be transparent or translucent should be found adjacent or overlapping the indicia 50 found on the differential pressure gauge 10 and should allow a user to view a position of the remote indicator 18 and especially the visual indicator 28 relative to the indicia 50.

There are several advantages to using a differential pressure gauge 10 as described hereinabove. First, without the presence of magnets, a chance for attracting metallic particles such as rust is minimized resulting in a more accurate pressure difference reading. Second, because the piston 14 is disposed in the first housing member 20 rather than the cylinder 12, the inclusion of grooves 26 in the piston 14 reduces fluid bypass without producing burrs in the cylinder 12. Third, a larger diameter piston 14 may be used in combination with a smaller diameter cylinder 12, thereby reducing cost and maximizing the accuracy of the pressure difference reading. Lastly, the materials used for the cylinder 12 and the first and second housing members 20, 22 are not required to be custom made, resulting in a lower cost for production thereof.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A differential pressure gauge comprising:
   a hollow cylinder;
   a first housing member disposed at a first end of the hollow cylinder;
   a second housing member disposed at a second end of the hollow cylinder;
   a piston having a first end and a second end, wherein the piston is slidably disposed in the first housing member and separates the first housing member into a low pressure side and a high pressure side; and
   a remote indicator coupled to the second end of the piston, wherein at least a portion of the remote indicator extends into the hollow cylinder and provides a visual indication of a pressure difference between the first end and the second end of the piston.

2. The differential pressure gauge of claim 1, wherein the first housing member includes a first pressure inlet in fluid communication with a first source of a pressurized fluid and the second housing member includes a second pressure inlet in fluid communication with a second source of a pressurized fluid having a higher pressure than the first source of a pressurized fluid.

3. The differential pressure gauge of claim 1, further comprising a spring configured to urge the remote indicator in a direction toward the second housing member and away from the first housing member.

4. The differential pressure gauge of claim 3, wherein the spring is a helical compression spring having a first and a second end, the first end abutting the first housing member and the second end abutting the remote indicator.

5. The differential pressure gauge of claim 1, wherein at least a portion of the hollow cylinder is at least one of transparent and translucent, the at least a portion coinciding with a range of positions of a visual indicator formed on the remote indicator.

6. The differential pressure gauge of claim 5, further including indicia disposed at least one of adjacent and overlapping an outer surface of the hollow cylinder, the indicia disposed at least one of adjacent and overlapping the at least a portion of the hollow cylinder, wherein the indicia is compared to a position of the visual indicator to determine a difference in pressure measured between the first end of the piston and the second end of the piston.

7. The differential pressure gauge of claim 1, wherein the hollow cylinder is formed from a transparent glass.

8. The differential pressure gauge of claim 1, wherein the first housing member and the piston are formed from the same material.

9. The differential pressure gauge of claim 8, wherein the first housing member and the piston are both formed from one of plastic, stainless steel, and aluminum.

10. The differential pressure gauge of claim 1, wherein an outer diameter of the piston is greater than an inner diameter of the hollow cylinder.

11. The differential pressure gauge of claim 1, wherein a substantially fluid tight seal is formed between the piston and the first housing member.

12. The differential pressure gauge of claim 11, wherein the seal is formed by a plurality of grooves formed in an outer surface of the piston, the grooves forming a labyrinth seal between the outer surface of the piston and an inner surface of the first housing member.

13. A differential pressure gauge comprising:
    a hollow cylinder including at least a portion of which is one of transparent and translucent;
    a first housing member disposed at a first end of the hollow cylinder;
    a second housing member disposed at a second end of the hollow cylinder;
    a piston having a first end and a second end, wherein the piston is slidably disposed in the first housing member and separates the first housing member into a low pressure side and a high pressure side; and
    a remote indicator coupled to the second end of the piston, wherein at least a portion of the remote indicator extends into the hollow cylinder adjacent the portion of the cylinder that is one of transparent and translucent and provides a visual indication of a pressure difference between the first end and the second end of the piston by comparing a position of the remote indicator relative to indicia located at least one of overlapping and adjacent the portion of the cylinder that is one of transparent and translucent.

14. The differential pressure gauge of claim 13, wherein the first housing member includes a first pressure inlet in fluid communication with a first source of a pressurized fluid and the second housing member includes a second pressure inlet in fluid communication with a second source of a pressurized fluid having a higher pressure than the first source of a pressurized fluid.

15. The differential pressure gauge of claim 13, further comprising a spring configured to urge the remote indicator in a direction toward the second housing member and away from the first housing member.

16. The differential pressure gauge of claim 13, wherein an outer diameter of the piston is greater than an inner diameter of the hollow cylinder.

17. The differential pressure gauge of claim 13, wherein the first housing member and the piston are formed from the same material.

18. A differential pressure gauge comprising:
   a hollow cylinder;
   a first housing member disposed at a first end of the cylinder, the first housing member having a first pressure inlet in fluid communication with a first source of a pressurized fluid;
   a second housing member disposed at a second end of the cylinder, the second housing member having a second pressure inlet in fluid communication with a second source of a pressurized fluid having a higher pressure than the first source of a pressurized fluid;
   a piston having a first end in fluid communication with the first pressure inlet and a second end in fluid communication with the second pressure inlet, wherein the piston is slidably disposed in the first housing member and separates the first housing member into a low pressure side adjacent the first end of the piston and a high pressure side adjacent the second end of the piston;
   a remote indicator coupled to the second end of the piston, at least a portion of the remote indicator having a visual indicator extending into the hollow cylinder; and
   a spring configured to urge the remote indicator in a direction toward the second housing member and away from the first housing member;
   wherein an increased pressure difference between the first pressure inlet and the second pressure inlet causes the remote indicator to move in a direction away from the second housing member and toward the first housing member, the remote indicator providing a measure of the pressure difference between the first end and the second end of the piston.

19. The differential pressure gauge according to claim 18, further including indicia disposed on or adjacent an outer surface of the hollow cylinder, the indicia disposed at least one of adjacent and overlapping a portion of the hollow cylinder that is at least one of transparent and translucent, wherein the indicia is compared to a position of a visual indicator disposed on the remote indicator to determine a difference in pressure measured between a first end of the piston and a second end of the piston.

20. The differential pressure gauge according to claim 18, wherein the spring is a helical compression spring having a first and a second end, the first end abutting the first housing member and the second end abutting the remote indicator.

* * * * *